United States Patent
Huennekens et al.

(10) Patent No.: US 10,150,448 B2
(45) Date of Patent: Dec. 11, 2018

(54) AUTONOMOUS VEHICLE UNAUTHORIZED PASSENGER OR OBJECT DETECTION

(71) Applicant: Ford Global Technologies, LLC, Dearborn, MI (US)

(72) Inventors: Johannes Huennekens, Ocean Grove (AU); Samuel Ellis, Herne Hill (AU); Greg Foletta, Anakie (AU)

(73) Assignee: FORD GLOBAL TECHNOLOGIES. LLC, Dearborn, MI (US)

(*) Notice: Subject to any disclaimer, the term of this patent is extended or adjusted under 35 U.S.C. 154(b) by 0 days.

(21) Appl. No.: 14/858,114

(22) Filed: Sep. 18, 2015

(65) Prior Publication Data

US 2017/0080900 A1 Mar. 23, 2017

(51) Int. Cl.
| | |
|---|---|
| H04L 29/06 | (2006.01) |
| G06K 19/06 | (2006.01) |
| G06F 17/30 | (2006.01) |
| G07B 13/04 | (2006.01) |
| B60R 25/31 | (2013.01) |
| G05D 1/00 | (2006.01) |
| G05D 1/02 | (2006.01) |
| B60W 30/00 | (2006.01) |
| G08B 21/00 | (2006.01) |

(52) U.S. Cl.
CPC ............ *B60R 25/31* (2013.01); *B60W 30/00* (2013.01); *G05D 1/0088* (2013.01); *G05D 1/0212* (2013.01); *G08B 21/00* (2013.01)

(58) Field of Classification Search
CPC ............ G05D 1/0088; G05D 1/0212
USPC .......................................................... 701/25
See application file for complete search history.

(56) References Cited

U.S. PATENT DOCUMENTS

| | | | |
|---|---|---|---|
| 5,999,865 A | 12/1999 | Bloomquist | |
| 8,660,734 B2 | 2/2014 | Zhu | |
| 8,874,301 B1 | 10/2014 | Rao et al. | |
| 8,880,270 B1 | 11/2014 | Ferguson | |
| 9,194,168 B1* | 11/2015 | Lu | E05F 15/70 |
| 9,429,947 B1* | 8/2016 | Wengreen | B60W 30/00 |
| 2008/0262669 A1 | 10/2008 | Smid et al. | |
| 2012/0028680 A1 | 2/2012 | Breed | |
| 2012/0083960 A1* | 4/2012 | Zhu | G05D 1/0214 701/23 |
| 2013/0289858 A1 | 10/2013 | Mangiat | |
| 2014/0306799 A1 | 10/2014 | Ricci | |

(Continued)

FOREIGN PATENT DOCUMENTS

| | | |
|---|---|---|
| CN | 104380349 | 2/2015 |
| DE | 102015208068 A1 * | 4/2015 |

(Continued)

OTHER PUBLICATIONS

UK Search Report dated Feb. 6, 2017 (5 pages).

*Primary Examiner* — Maceeh Anwari
(74) *Attorney, Agent, or Firm* — Frank A. MacKenzie; Bejin Bieneman PLC

(57) ABSTRACT

A vehicle system includes a sensor programmed to output an occupant or object detection signal indicating a presence of an unauthorized occupant or unauthorized object in a host vehicle. An autonomous mode controller is programmed to determine, from the occupant or object detection signal, whether to operate the host vehicle in an autonomous mode.

20 Claims, 2 Drawing Sheets

(56) References Cited

U.S. PATENT DOCUMENTS

| | | | |
|---|---|---|---|
| 2014/0350855 A1* | 11/2014 | Vishnuvajhala | G06Q 50/10 701/538 |
| 2015/0091713 A1* | 4/2015 | Kohlenberg | B60R 25/32 340/426.36 |
| 2015/0149023 A1 | 5/2015 | Allard et al. | |
| 2015/0232064 A1 | 8/2015 | Cudak et al. | |
| 2016/0328976 A1 | 11/2016 | Jo et al. | |

FOREIGN PATENT DOCUMENTS

| | | |
|---|---|---|
| WO | 2015099679 A1 | 7/2015 |
| WO | 2016128200 A1 | 8/2016 |
| WO | 2016173836 A1 | 11/2016 |

\* cited by examiner

AUTONOMOUS VEHICLE UNAUTHORIZED PASSENGER OR OBJECT DETECTION

BACKGROUND

Autonomous taxi services can use an autonomous vehicle to transport passengers to a desired location. Someone wishing to use an autonomous taxi service may communicate his or her desired pick-up and drop-off locations to a dispatcher either via telephone or through an application running on a mobile device. The dispatcher may communicate that information to an available autonomous vehicle, which may then navigate to the pick-up location and take the passenger to the drop-off location.

DETAILED DESCRIPTION

Fully autonomous vehicles can navigate without human interaction. Thus, when used in a taxi service, the autonomous vehicle need not have a driver in the vehicle. Therefore, when an autonomous vehicle arrives at a pick-up location, the autonomous vehicle may be, and is indeed expected to be, empty of both passengers and objects. Since there is no driver, there is no one in the autonomous vehicle to ensure that no passengers or objects remain in the vehicle between picking up authorized passengers. Users of autonomous vehicle taxi services will expect the vehicles to be clean and unoccupied upon arrival at the pick-up location.

An example vehicle system that can detect unauthorized occupants or objects in a host vehicle (e.g., an autonomous vehicle used in an autonomous taxi service) includes a sensor programmed to output an occupant or object detection signal indicating the presence of the unauthorized occupant or object. The vehicle system further includes an autonomous mode controller programmed to determine, from the occupant or object detection signal, whether to operate the host vehicle in an autonomous mode. For instance, before travelling to a pick-up location, the sensor may scan the interior, exterior, and cargo areas of the host vehicle to determine whether any unauthorized passengers or objects are in the host vehicle. If none, the host vehicle may proceed to the next pick-up location to pick up the next authorized passenger. If, however, an unauthorized occupant or object is detected, the autonomous mode controller may prevent the host vehicle from operating in an autonomous mode. Alternatively, the autonomous mode controller may be programmed to navigate the host vehicle to, e.g., a police station or other secure compound or public safety facility so that the unauthorized occupant or object may be investigated by the appropriate authorities.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
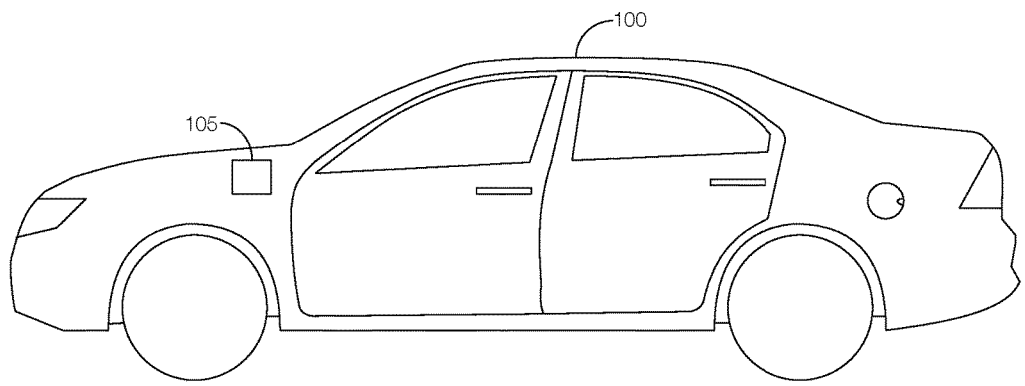
FIG. 1 illustrates an example autonomous vehicle with a system for detecting unauthorized objects and unauthorized occupants.

As illustrated in FIG. 1, the host vehicle 100 includes a vehicle system 105 that can detect the presence of an unauthorized occupant or object prior to navigating to a pick-up location. Although illustrated as a sedan, the host vehicle 100 may include any passenger or commercial automobile such as a car, a truck, a sport utility vehicle, a crossover vehicle, a van, a minivan, a taxi, a bus, etc. The vehicle system 105 may alternatively be incorporated into other types of host vehicles 100 such as autonomous motorcycles, tricycles, autonomous pods, aircraft, watercraft, etc. The host vehicle 100 is an autonomous vehicle that can operate in an autonomous (e.g., driverless, pilotless) mode.

A person (referred to as a "passenger") wishing to use the host vehicle 100 as an autonomous taxi may arrange a pick-up time, a pick-up location, and a drop-off location either directly with the host vehicle 100 or through an intermediary such as a taxi dispatcher. The passenger may make such arrangements with the host vehicle 100 or the taxi dispatcher via telephone, an application running on a mobile device, a web interface, email, etc. The host vehicle 100 may be dispatched to the pick-up location in accordance with the desired pick-up time. Prior to being dispatched or otherwise arriving at the pick-up location, however, the vehicle system 105 may determine whether any unauthorized occupants or objects are located in the host vehicle 100. The host vehicle 100 may be dispatched to the pick-up location at the pick-up time if there are no unauthorized occupants or objects located in the host vehicle 100. Further, the host vehicle 100 may take certain precautions to prevent unauthorized occupants from gaining access to the host vehicle 100. For instance, the doors of the host vehicle 100 may be locked until the host vehicle 100 reaches the pick-up location. Locking the doors may prevent an unauthorized occupant from entering or placing an unauthorized object into the host vehicle 100. In some instances, the doors may unlock when, e.g., the passenger identifies himself to the host vehicle 100 by entering a door unlock code provided to the passenger via the dispatcher, a mobile device, an email, etc., or by the passenger providing a user input to, e.g., an application executed on a mobile device.

An "unauthorized occupant" may refer to any person who is not authorized to use the host vehicle 100. For instance, the "unauthorized occupant" may refer to anyone other than the passenger(s) who requested use of the host vehicle 100. Moreover, "unauthorized occupant" may refer to any passenger who remains in or reenters the host vehicle 100 after arriving at the drop-off location. Thus, an authorized passenger may become an unauthorized occupant. An "unauthorized object" may include any object left in the host vehicle 100 after all passengers, whether authorized or otherwise, have vacated the host vehicle 100. Thus unauthorized objects may include purses, backpacks, cell phones, computers, packages, luggage bags, explosive devices or other threatening objects, etc. or anything else that may have been left or placed in the host vehicle 100 by a previous passenger or anybody else. In some instances, "unauthorized objects" may further refer to refuse or other forms of waste, including biological waste, left in the host vehicle 100.

The presence of an unauthorized occupant or unauthorized object may prevent the host vehicle 100 from navigating to the pick-up location. Instead, the host vehicle 100 may navigate to a place where the unauthorized occupant or unauthorized object can be investigated, such as a police station or other public safety facility. In some instances, an image of the passenger compartment of the host vehicle 100 may be captured and transmitted to either a dispatcher, the passenger, or both. That way, the dispatcher or passenger can verify whether the autonomous vehicle is indeed empty (a false positive) and should proceed to the pick-up location. If the dispatcher or passenger confirms an unauthorized occupant or unauthorized object in the host vehicle 100, the dispatcher or passenger may be able to reject the use of the host vehicle 100 and, in some instances, send the host vehicle 100 to, e.g., a local police station or other public safety facility. If the unauthorized object includes refuse or other waste, the host vehicle 100 may be sent to a location where the interior of the host vehicle 100 can be cleaned before the host vehicle 100 is sent to pick up passengers.

Figure 2:
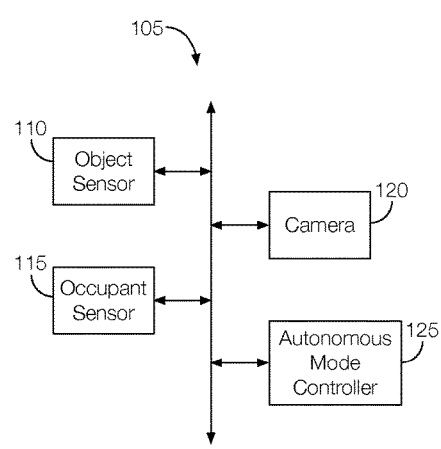
FIG. 2 is a block diagram of the vehicle system of FIG. 1.

Referring now to FIG. 2, the vehicle system 105 includes an object sensor 110, an occupant sensor 115, a camera 120, and an autonomous mode controller 125.

The object sensor 110 may include any number of circuits or components programmed or configured to detect objects inside, outside, on top of or underneath the host vehicle 100. Examples of object sensors 110 may include a heat sensor, an infrared sensor, a motion sensor, a force gauge, a weight sensor, a capacitive sensor, a displacement sensor (which may be incorporated into or otherwise work with the suspension system, for instance), a pressure sensor (which may be incorporated into or otherwise work with the tires), a speed sensor (which maybe incorporated into or otherwise work with a braking module to determine, e.g., tire deflection), a torque sensor (which may be incorporated into or otherwise work with the powertrain system to estimate an increase in vehicle mass), an inductive sensor, a resistance sensor, or the like. The object sensor 110 may be programmed to scan the passenger compartment, cargo area, vehicle body, undercarriage, roof, etc., of the host vehicle 100 for unauthorized objects. In some instances, the object sensor 110 may compare images of areas of the host vehicle 100 as it presently appears to images of the host vehicle 100 known to be without any unauthorized objects, which may be stored locally or in a remote server and made accessible to the host vehicle 100. In some instances, the recently captured images may be transmitted to the remote server so the remote server or another computing device or a trained operator can compare the images. In some possible implementations, the object sensor 110 may additionally or alternatively include an air quality sensor programmed to evaluate the air in the host vehicle 100 for particular chemicals that may indicate the presence of unauthorized objects. The object sensor 110 may additionally or alternatively include a chemical sensor programmed to determine whether particular chemicals, such as chemicals used in explosive devices, are present in the host vehicle 100. If any anomalies are detected, including anomalies identified by the remote server, the object sensor 110 may output an object detection signal indicating the presence of the unauthorized object. In some instances, the sensor data can be transmitted to and reviewed by a person to determine whether any unauthorized objects are in the host vehicle 100 and whether the host vehicle 100 can be dispatched to the pick-up location.

The occupant sensor 115 may include any number of circuits or components programmed or configured to detect unauthorized occupants in the host vehicle 100, including unauthorized occupants hiding in the passenger compartment, on the roof, below the host vehicle 100, on the side of the host vehicle 100, or in the cargo area. The occupant sensor 115 may include, e.g., a heat sensor, an infrared sensor, a motion sensor, a force gauge, a weight sensor, a capacitive sensor, a displacement sensor, a pressure sensor, a torque sensor, an inductive sensor, a resistive sensor, or the like. If an unauthorized occupant is detected, the occupant sensor 115 may be programmed to output an occupant detection signal indicating the presence of the unauthorized occupant. In some instances, the occupant detection signal may indicate where the unauthorized occupant was detected. Further, the action taken in response to detecting the unauthorized occupant may depend on where the unauthorized occupant was detected. For instance, if an unauthorized occupant is detected on the roof of the host vehicle 100, the host vehicle may simply stop and not move again until the unauthorized person is removed from the roof. If the unauthorized occupant is detected in the cargo area or passenger compartment, the host vehicle 100 may autonomously navigate to a local police station or other public safety facility so that the host vehicle 100 can be inspected.

The camera 120 may include any number of circuits or components programmed or configured to capture images of the interior or exterior of the host vehicle 100. The camera 120 may, for instance, capture images of the passenger compartment, the cargo area, or the outside of the host vehicle 100 including the roof, the vehicle body, the undercarriage, etc. The camera 120 may be programmed to capture images periodically or at certain times, such as when authorized passengers exit the host vehicle 100, before the host vehicle 100 is dispatched to a pick-up location, or other times when the host vehicle 100 is supposed to be vacant of both objects and passengers.

The autonomous mode controller 125 may include any number of circuits or components programmed or configured to receive the occupant detection signal, the object detection signal, or both, and determine whether to operate the host vehicle 100 in an autonomous mode based on, e.g., the presence of an unauthorized occupant or object in the host vehicle 100.

The autonomous mode controller 125 may be programmed to autonomously operate the host vehicle 100 in various modes including a pick-up mode and a drop-off mode. Operating the host vehicle 100 in the pick-up mode may include autonomously navigating the host vehicle 100 to a pick-up location at a particular time, referred to as a pick-up time. The autonomous mode controller 125 may expect the host vehicle 100 to be empty of both occupants and objects when operating in the pick-up mode. Operating the host vehicle 100 in the drop-off mode may include autonomously navigating the host vehicle 100 to a drop-off location with one or more authorized passengers and objects inside the host vehicle 100. Thus, the autonomous mode controller 125 may expect the host vehicle 100 to have passengers and possibly objects inside the host vehicle 100 while operating in the drop-off mode.

Prior to autonomously operating the host vehicle 100, the autonomous mode controller 125 may determine a vehicle status. Examples of vehicle statuses may include an occupied status indicating that the host vehicle 100 is occupied with an occupant, an object present status indicating that an object is in the host vehicle 100, an unoccupied status indicating that no occupants are in the host vehicle 100, an object absent status indicating that no objects are present in the host vehicle 100, and an all clear status indicating that no occupants or objects are present in the host vehicle 100.

The vehicle status may be determined from the occupant detection signal, the object detection signal, or both. Since the presence of the occupant detection signal and the object detection signal may indicate the presence of an unauthorized occupant or object, respectively, the autonomous mode controller 125 may determine the vehicle status from one or both of those signals. Moreover, multiple vehicle statuses may apply at any particular time. For example, if the autonomous mode controller 125 receives the occupant detection signal but not the object detection signal, the autonomous mode controller 125 may assign the occupied status and the object absent status to the host vehicle 100. If the autonomous mode controller 125 receives the object detection signal but not the occupant detection signal, the autonomous mode controller 125 may assign the unoccupied status and the object present status to the host vehicle 100. If both the occupant detection signal and the object detection signal are received, the autonomous mode controller 125 may assign the occupied status and the object present status to the host vehicle 100. In the absence of both the occupant detection signal and the object detection signal, the autonomous mode controller 125 may assign the all clear status to the host vehicle 100.

The autonomous mode controller 125 may be programmed to receive instructions from a remote server, a mobile device, or any other device capable of wireless communication with the host vehicle 100. Signals may be wirelessly transmitted from the remote server or mobile device and received by at the host vehicle 100 via, e.g., a communication device. The communication device may transmit the signals to the autonomous mode controller 125, which may process the signals to receive, e.g., dispatch information including the pick-up location, pick-up time, destination location, etc.

In one possible implementation, the autonomous mode controller 125 may be programmed to only navigate to the pick-up location if the host vehicle 100 is empty (the all clear status) of both occupants and objects. Thus, in response to receiving dispatch information, the autonomous mode controller 125 may determine the vehicle status. In some instances, the autonomous mode controller 125 may determine the vehicle status locally, that is, by processing the occupant detection signal, the object detection signal, and the images captured by the camera 120. Alternatively, the occupant detection signal, the object detection signal, or the images may be transmitted to and processed by a remote server, which may in turn transmit a signal indicating the vehicle status back to the host vehicle 100.

The actions of the autonomous mode controller 125, in response to receiving the dispatch information and determining the vehicle status, may be dependent upon the determined vehicle status. If the vehicle status is the all clear status, the autonomous mode controller 125 may autonomously navigate the host vehicle 100 to the pick-up location. If the vehicle status is anything other than the all clear status, however, the autonomous mode controller 125 may take a different predetermined action. For instance, if the vehicle status indicates that the host vehicle 100 is occupied or has an object when it should be empty, the autonomous mode controller 125 may navigate the host vehicle 100 to a local police station or other public safety facility. In some instances, the autonomous mode controller 125 may command the camera 120 to capture an image of the interior of the host vehicle 100 and transmit the image to a remote server so that the presence of the unauthorized occupant or object can be visually confirmed by, e.g., a dispatcher. In some instances, the image may be transmitted to the person who requested the host vehicle 100 and he or she can decide (through a user input provided to a mobile device) whether he or she wishes to have the host vehicle 100 sent to the pick-up location or whether he or she would like to use a different host vehicle 100.

In some instances, the image may be presented to the person who requested the host vehicle 100 to, e.g., allow that person to select which host vehicle 100 he or she wishes to use. In one possible implementation, the image may be transmitted to the person who requested the host vehicle 100 regardless of the vehicle status prior to the host vehicle 100 navigating to the pick-up location. With the image, which may be viewed on a mobile device or other computing device, the host vehicle 100 may be visually inspected (i.e., an inspection mode), allowing the person to determine whether the host vehicle 100 is clean and unoccupied. If so, the person may provide a user input to a mobile device that approves the host vehicle 100. If the host vehicle 100 is not to the person's liking, the person may, through a user input provided to the mobile device, request a different host vehicle 100. An image of a different host vehicle 100 may be sent for the person to inspect and decide whether he or she wishes to travel in the different host vehicle 100.

The autonomous mode controller 125 may further receive commands from, e.g., the dispatcher or the person who requested the host vehicle 100 concerning what to do if an unauthorized occupant or object is in the host vehicle 100. For instance, the dispatcher or person who requested the host vehicle 100, upon inspection of the image, may command the autonomous mode controller 125 through a user input provided to, e.g., a mobile device or other computing device, to navigate to a local police station or other public safety facility if the host vehicle 100 includes an unauthorized occupant or to a cleaning facility if e.g., the interior of the host vehicle 100 includes refuse or other forms of waste.

If there are no unauthorized persons or objects in the host vehicle 100, the autonomous mode controller 125 may be programmed to navigate the host vehicle 100 to the pick-up location and transport the passenger who requested the host vehicle 100 to the drop-off location. If the passenger does not exit the host vehicle 100 in a certain period of time, the occupant sensor 115 may output the occupant detection signal to the autonomous mode controller 125, indicating that the passenger is now an unauthorized occupant. Thus, the autonomous mode controller 125 may prevent the host vehicle 100 from travelling to the next pick-up location until the occupant exits the host vehicle 100. In some instances, an alert may be presented to the unauthorized occupant requesting that he or she exit the host vehicle 100.

Similarly, if the passenger leaves an object in the host vehicle 100 after the host vehicle 100 arrives at the drop-off location and the passenger exits the host vehicle 100, the object sensor 110 may output the object detection signal and the autonomous mode controller 125 may identify the object as an unauthorized object. In some instances, the autonomous mode controller 125, either directly or through the remote server, may contact the previous passenger via the passenger's mobile device to remove the object from the host vehicle 100. If the object is not removed within a certain period of time, the autonomous mode controller 125 may navigate the host vehicle 100 to a local police station or other public safety facility to have the object removed. Once removed, the autonomous mode controller 125 may navigate to the next pick-up location.

When unauthorized occupants or objects are detected, the autonomous mode controller 125 may communicate to the dispatcher, via a signal sent to the remote server, that the host vehicle 100 is temporarily unavailable for dispatch. The autonomous mode controller 125 may send a subsequent signal to the remote device indicating that it is available for dispatch once any unauthorized occupants or objects are no longer in the host vehicle 100.

Figure 3:
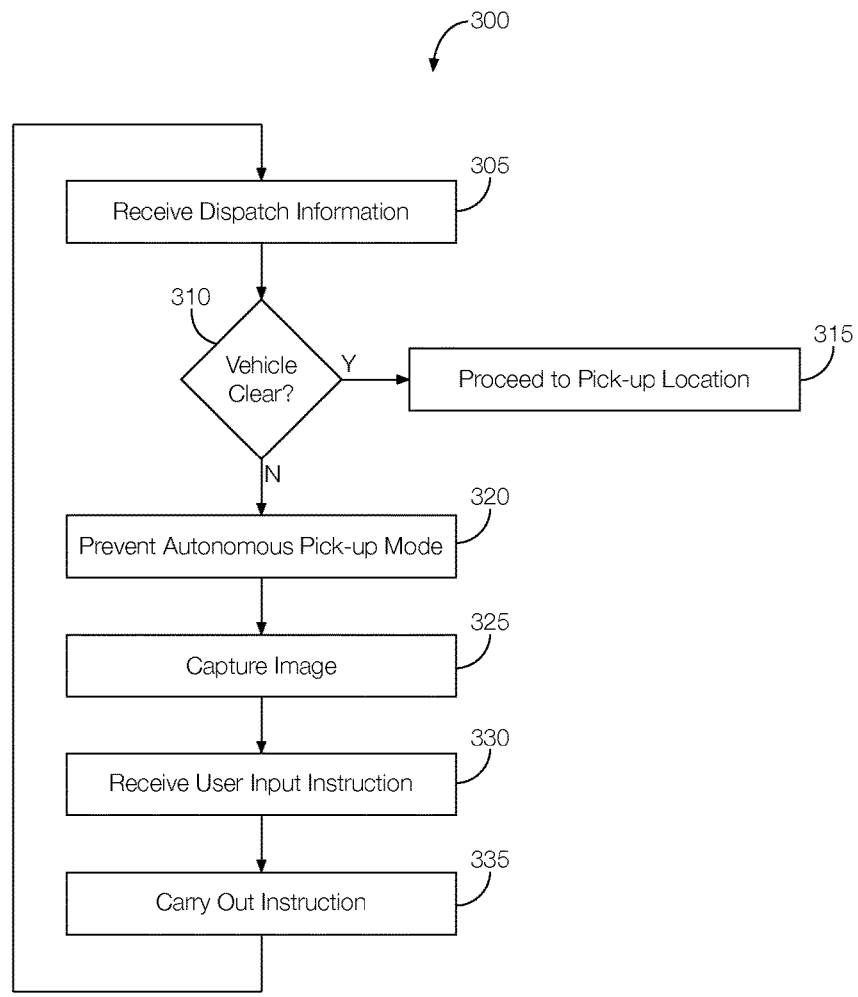
FIG. 3 is a flowchart of an example process that may be executed by the vehicle system to detect unauthorized objects and unauthorized occupants.

FIG. 3 is a flowchart of an example process 300 that may be executed by the vehicle system 105 to detect unauthorized objects and unauthorized occupants. The process 300 may be initiated when the host vehicle 100 is started and is ready to travel to a pick-up location to pick up passengers. The process 300 may continue to run until the host vehicle 100 is turned off or is no longer accepting new passengers.

At block 305, the vehicle system 105 may receive dispatch information. The dispatch information may identify a pick-up location and may be received from, e.g., a remote server or a mobile device. The dispatch information may be received via an on-board communication device and transmitted to, e.g., the autonomous mode controller 125.

At block 310, the vehicle system 105 may determine the status of the host vehicle 100. The status may be determined locally at the host vehicle 100 or based on a signal received from a remote server. The status may include an all clear status indicating that the host vehicle 100 is empty (i.e., there are no unauthorized occupants or objects), an occupied status, an unoccupied status, an object present status, an object absent status, etc. If the status is the all clear status, the process 300 may proceed to block 315. If the status is any other status than the all clear status, the process 300 may proceed to block 320.

At block 315, the vehicle system 105 may allow the host vehicle 100 to travel to the pick-up location. For instance, the autonomous mode controller 125 may permit the host vehicle 100 to operate in the autonomous pick-up mode, which includes traveling to the pick-up location in accordance with the pick-up time indicated in the dispatch information.

At block 320, the vehicle system 105 may prevent the host vehicle 100 from going to the pick-up location. For instance, the autonomous mode controller 125 may prevent the host vehicle 100 from operating in the autonomous pick-up mode. In one possible approach, the autonomous mode controller 125 may cause a signal to be transmitted to the remote server indicating that the host vehicle 100 is temporarily unavailable for dispatch. The process 300 may continue at block 325, where alternative actions may be taken to address the unauthorized occupant or object in the host vehicle 100.

Beginning at block 325, the vehicle system 105 may address the unauthorized occupant or object in the host vehicle 100. For example, at block 325, the camera 120 may capture an image of the interior of the vehicle and transmit the image to the remote server or the mobile device so that a person can visually confirm the presence of the unauthorized occupant or object.

At block 330, the vehicle system 105 may receive a user input indicating the presence or absence of the unauthorized occupant or object and an instruction for proceeding. The instruction may include, e.g., a user input commanding the host vehicle 100 to navigate to a local police station or other public safety facility, to a facility where the host vehicle 100 can be cleaned, etc. In the case of a false positive (i.e., visual inspection concludes that there are no unauthorized occupants or objects), the instruction can include a user input for the host vehicle 100 to proceed to the pick-up location. In some instances, the instruction may include an alert to be played in or near the host vehicle 100 requesting that the occupant vacate the host vehicle 100 or remove any left-behind objects. The instruction may be received at the host vehicle 100 via a wireless communication device and transmitted to the autonomous mode controller 125.

At block 335, the vehicle system 105 may carry out the instruction. For instance, the autonomous mode controller 125 may, in response to the instruction, operate the host vehicle 100 in an autonomous mode and, e.g., navigate the host vehicle 100 to a police station or other public safety facility or a facility where the host vehicle 100 can be cleaned. In the case of a false positive, the autonomous mode controller 125 may navigate the host vehicle 100 to the pick-up location. If the instruction includes an alert, the autonomous mode controller 125 may communicate with other vehicle components, such as a vehicle speaker or HMI, to carry out the alert. After presenting the alert, the process 300 may proceed to block 310 so that vehicle system 105 can reevaluate whether any unauthorized occupants or objects remain, and if so, to take appropriate actions. If the action taken at block 335 includes autonomously navigating the host vehicle 100 to a police station or other public safety facility, cleaning facility, or pick-up location, the process 300 may end after block 335 and may begin again when the host vehicle 100 is ready to receive dispatch information.

Accordingly, the disclosed vehicle system 105 can detect unauthorized occupants or objects in the host vehicle 100 used in an autonomous taxi service. Before travelling to a pick-up location, the interior, exterior, and cargo areas of the host vehicle 100 are scanned to determine whether any unauthorized passengers or objects are in the host vehicle 100. If none, the host vehicle 100 may proceed to the next pick-up location to pick up the next authorized passenger. If, however, an unauthorized occupant or object is detected, the autonomous mode controller 125 may prevent the host vehicle 100 from operating in the autonomous pick-up mode. Alternatively, the autonomous mode controller 125 may navigate the host vehicle 100 to, e.g., a police station or other public safety facility so that the unauthorized occupant or object may be investigated by the appropriate authorities. With the disclosed vehicle system 105, users of the autonomous vehicle taxi service will have some confidence that vehicles will arrive clean and unoccupied.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a sensor programmed to output an occupant detection signal indicating a presence of an occupant in a host vehicle;
   a camera programmed to capture an image of the occupant in the host vehicle; and
   an autonomous mode controller programmed to determine, from the occupant detection signal, whether an unauthorized passenger is present in the host vehicle and temporarily prevent the host vehicle from operating in an autonomous mode in response to detecting the unauthorized passenger,
   wherein the autonomous mode controller is programmed to determine that the occupant is the unauthorized passenger as a result of detecting the occupant after receiving a request for the host vehicle to proceed to a pick-up location and before the host vehicle arrives at the pick-up location,
   wherein the autonomous mode controller is programmed to prompt a user to provide a user input via a remote device external to the host vehicle as a result of detecting the unauthorized passenger and receive the user input after prompting the user to provide the user input, wherein prompting the user includes transmitting the image of the occupant captured by the camera to the remote device and wherein the user input instructs the autonomous mode controller to operate the host vehicle in the autonomous mode despite detecting the unauthorized passenger shown in the image.

2. The vehicle system of claim 1, wherein the autonomous mode controller is programmed to autonomously operate the host vehicle in at least one of the pick-up mode, a drop-off mode, and an inspection mode.

3. The vehicle system of claim 2, wherein the autonomous mode controller is programmed to begin operating the host vehicle in the pick-up mode as a result of determining that the host vehicle has no occupants.

4. The vehicle system of claim 3, wherein operating the host vehicle in the pick-up mode includes beginning to autonomously navigate the host vehicle to the pick-up location in response to detecting that the host vehicle has no occupants.

5. The vehicle system of claim 2, wherein the autonomous mode controller is programmed to operate the host vehicle in the drop-off mode as a result of determining that the host vehicle has at least one occupant after arriving at the pick-up location.

6. The vehicle system of claim 5, wherein operating the host vehicle in the drop-off mode includes autonomously navigating the host vehicle, with the at least one occupant, to a drop-off location.

7. The vehicle system of claim 1, wherein the autonomous mode controller is programmed to determine a vehicle status from the occupant detection signal.

8. The vehicle system of claim 7, wherein the vehicle status includes at least one of an occupied status, indicating that the host vehicle is occupied with at least one occupant, and an unoccupied status, indicating that the host vehicle has no occupants.

9. The vehicle system of claim 1, wherein the autonomous mode controller is programmed to receive dispatch information including a destination and navigate the host vehicle to the destination.

10. A vehicle system comprising:
an object sensor programmed to output an object detection signal indicating a presence of an unauthorized object in a host vehicle:,
a camera programmed to capture an image of the unauthorized object in the host vehicle; and
an autonomous mode controller programmed to determine, from the object detection signal, whether the unauthorized object is present in the host vehicle and temporarily prevent the host vehicle from operating in an autonomous mode in response to detecting the unauthorized object,
wherein the autonomous mode controller is programmed to detect the unauthorized object as a result of detecting an object located in the host vehicle after receiving a request for the host vehicle to proceed to a pick-up location and before arriving at the pick-up location,
wherein the autonomous mode controller is programmed to prompt a user to provide a user input via a remote device external to the host vehicle as a result of detecting the unauthorized object and receive the user input after prompting the user to provide the user input,
wherein prompting the user includes transmitting the image of the unauthorized object captured by the camera to the remote device, the user input instructing the autonomous mode controller to operate the host vehicle in the autonomous mode despite detecting the unauthorized object shown in the image.

11. The vehicle system of claim 10, wherein the autonomous mode controller is programmed to autonomously operate in an inspection mode as a result of receiving the user input, wherein the user input confirms the presence of the unauthorized object.

12. The vehicle system of claim 11, wherein the autonomous mode controller is programmed to begin operating the host vehicle in the pick-up mode as a result of determining that the host vehicle has no unauthorized objects.

13. The vehicle system of claim 12, wherein operating the host vehicle in the pick-up mode includes beginning to autonomously navigate the host vehicle to the pick-up location in response to detecting that the host vehicle has no unauthorized objects.

14. The vehicle system of claim 11, wherein the autonomous mode controller is programmed to operate the host vehicle in the drop-off mode as a result of determining that the host vehicle has at least one occupant after arriving at the pick-up location and wherein operating the host vehicle in the drop-off mode includes autonomously navigating the host vehicle, with the at least one occupant, to a drop-off location.

15. The vehicle system of claim 10, wherein the autonomous mode controller is programmed to receive dispatch information including a pick-up location and navigate the host vehicle to the pick-up location.

16. A method comprising:
receiving a vehicle status signal indicating a presence of at least one of an unauthorized object and an unauthorized occupant in a host vehicle;
determining that at least one of the unauthorized object and the unauthorized occupant is present in the host vehicle from the vehicle status signal;
capturing an image of at least one of the unauthorized object and the unauthorized occupant, wherein the unauthorized occupant is an occupant detected after receiving a request for the host vehicle to proceed to a pick-up location and before the host vehicle arrives at the pick-up location and wherein the unauthorized object is an object detected in the host vehicle after receiving the request for the host vehicle to proceed to the pick-up location and before the host vehicle arrives at the pick-up location;
temporarily preventing the host vehicle from operating in an autonomous pick-up mode as a result of determining that at least one of the unauthorized object and the unauthorized occupant is present in the host vehicle;
transmitting the image to a remote device external to the host vehicle;
prompting a user to provide a user input via the remote device external to the host vehicle as a result of determining that the at least one of the unauthorized object and the unauthorized occupant is present in the host vehicle;
receiving the user input from the remote device external to the host vehicle, the user input confirming the presence of at least one of the unauthorized occupant and the unauthorized object shown in the image; and
authorizing, via the user input, the host vehicle to autonomously navigate the host vehicle to one of a cleaning facility and a police station as a result of receiving the user input.

17. The method of claim 16, wherein the autonomous pick-up mode includes autonomously navigating the host vehicle to the pick-up location.

18. The method of claim 16, further comprising receiving dispatch information including the pick-up location.

19. The method of claim 18, further comprising beginning to navigate the host vehicle to the pick-up location as a result of the vehicle status signal indicating that no unauthorized objects and no unauthorized occupants are in the host vehicle.

20. The vehicle system of claim 1, wherein the user input confirms the presence of the occupant in the host vehicle and wherein the autonomous mode controller is programmed to autonomously navigate the host vehicle to a police station as a result of receiving the user input.

\* \* \* \* \*